US011102684B1

(12) United States Patent
Belser et al.

(10) Patent No.: US 11,102,684 B1
(45) Date of Patent: Aug. 24, 2021

(54) BLIND HANDOVER WITH ADAPTIVE LEARNING BASED ON PAST FAILURES TO TRIGGER HANDOVER OF BEAMFORMING-SERVED DEVICES

(71) Applicant: Sprint Spectrum L.P., Overland Park, KS (US)

(72) Inventors: John E. Belser, Olathe, KS (US); Paul M. Andreas, Overland Park, KS (US); Bryce A. Jones, Overland Park, KS (US); Christopher Bailey, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 7 days.

(21) Appl. No.: 15/929,221

(22) Filed: Feb. 10, 2020

(51) Int. Cl.
*H04W 68/02* (2009.01)
*H04W 36/00* (2009.01)
*H04B 7/06* (2006.01)
*H04W 36/32* (2009.01)

(52) U.S. Cl.
CPC .... *H04W 36/00837* (2018.08); *H04B 7/0617* (2013.01); *H04W 36/0058* (2018.08); *H04W 36/0079* (2018.08); *H04W 36/0085* (2018.08); *H04W 36/32* (2013.01)

(58) Field of Classification Search
CPC ... H04W 72/042; H04W 36/28; H04W 72/12; H04W 76/10; H04W 16/32; H04W 4/025; H04B 17/309; H04L 25/0224; H04L 5/0048
See application file for complete search history.

(56) References Cited

U.S. PATENT DOCUMENTS

| 9,585,072 | B1 | 2/2017 | Liu et al. |
| 9,906,993 | B2 | 2/2018 | Singh et al. |
| 2019/0239129 | A1* | 8/2019 | Tidestav ........... H04W 36/0033 |
| 2019/0363910 | A1* | 11/2019 | Ugurlu .................. H04W 24/06 |

* cited by examiner

*Primary Examiner* — Phuoc H Doan

(57) ABSTRACT

A method and system for blindly triggering handover based on past failures to trigger handover of beamforming-served devices. A computing system identifies a geolocation area where wireless communication devices (WCDs) that are served with beamforming by a first access node tend to experience radio link failure after having reported to the first access node being within threshold weak coverage of the first access node and threshold strong coverage of a second access node. And, based on the identifying, the computing system then blindly triggers handover of a given WCD from the first access node to the second access node in response to determining that the given WCD is served with beamforming by the first access node while positioned in the identified geolocation area.

20 Claims, 6 Drawing Sheets

BLIND HANDOVER WITH ADAPTIVE LEARNING BASED ON PAST FAILURES TO TRIGGER HANDOVER OF BEAMFORMING-SERVED DEVICES

BACKGROUND

A cellular wireless network typically includes a number of access nodes that are configured to provide wireless coverage areas in which wireless communication devices (WCDs) such as cell phones, tablet computers, machine-type-communication devices, tracking devices, embedded wireless modules, and/or other wirelessly equipped devices can operate. Further, each access node could be coupled with a core network that provides connectivity with various application servers and/or transport networks, such as the public switched telephone network (PSTN) and/or the Internet for instance. With this arrangement, a WCD within coverage of the cellular network could engage in air interface communication with an access node and could thereby communicate via the access node with various application servers and other entities.

Such a network could operate in accordance with a particular radio access technology (RAT), with communications from the access nodes to WCDs defining a downlink or forward link and communications from the WCDs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

On the downlink and uplink channels, the air interface on each carrier could be configured in a specific manner to define physical resources for carrying information wirelessly between the access node and WCDs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served WCDs.

In addition, certain resource elements on the example air interface could be reserved for special purposes. For instance, on the downlink, certain resource elements could be reserved to carry synchronization signals that indicate the presence of coverage on the carrier, other resource elements could be reserved to carry broadcast messages specifying system information, and still other resource elements could be reserved to carry a reference signal that WCDs could measure in order to determine coverage strength.

OVERVIEW

When a WCD enters into coverage of an example network, the WCD could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an RRC connection or the like through which the access node will then serve the WCD on the carrier. Further, if the WCD is not already registered for service with the core network, the WCD could transmit to the access node an attach request, which the access node could forward to a core-network controller for processing. And the core-network controller and access node could then coordinate setup for the WCD of one or more bearers extending between the WCD and a core-network gateway that provides transport-network connectivity.

Once the WCD is so connected and registered with the example network, the access node could then serve the WCD in a connected mode on the carrier, managing downlink air-interface communication of packet data to the WCD and uplink air-interface communication of packet data from the WCD.

For example, with the air interface described above, when packet data for the WCD arrives at the core network from a transport network, the data could flow to the WCD's serving access node, and the access node could then schedule and provide transmission of that data to the WCD on particular downlink PRBs of the carrier. Likewise, when the WCD has data to transmit on the transport network, the WCD could transmit a scheduling request to the access node, the access node could responsively schedule transmission of that data from the WCD on particular uplink PRBs of the carrier, and the WCD could accordingly transmit the data to the access node for forwarding through the core network to the transport network.

While a WCD is connected with and served by an access node, the WCD could also continue to regularly monitor coverage strength from the access node and/or other access nodes in the vicinity, and the WCD could transmit measurement reports and/or other channel quality reports to its serving access node, to facilitate management of the WCD's connection and service. For instance, the WCD could generate and transmit such reports periodically or in response to specific triggers, such as when certain measurement thresholds are met.

Measurement reporting from the WCD could work to trigger handover of the WCD when appropriate. For example, if the WCD reports to its serving access node that the WCD has threshold weak coverage from the serving access node and threshold strong coverage (e.g., threshold stronger coverage) from another access node, the serving access node could responsively coordinate handover of the WCD to that other access node. To do so, for instance, the serving access node may engage in control signaling with the other access node to prepare the other access node to serve the WCD, and the serving access node may then direct the WCD to transition to be served by the other access node.

In addition, while a WCD is connected with and served by an access node, the access node may or may not serve the WCD with beamforming. Without beamforming, the access node's transmissions to the WCD (e.g., scheduled downlink transmissions to the WCD) would radiate generally throughout the access node's coverage area, much like reference signals and other broadcasts from the access node. Whereas, with beamforming, the access node's transmissions to the WCD would optimally be focused as a targeted beam of electromagnetic energy specifically to the WCD, which could help improve reliability.

Beamforming can help to improve the access node's antenna gain and associated transmission quality and throughput in the direction of the UE. Further, with transmission focused in the direction of the WCD, beamforming could help to reduce interference to other WCDs and could enable the access node to transmit to multiple WCDs concurrently on the same air-interface resources (e.g., PRBs) as each other.

The access node could thus opt to serve a WCD with beamforming in response to various triggers. For example, if and when the WCD reports being in relatively weak coverage of the access node, the access node could responsively set itself to beamform to the WCD to help improve quality of downlink transmissions to the WCD. And as another example, if and when the access node seeks to optimize use of the access node's limited air interface resources, the access node could set itself to beamform to each WCD of a group of WCDs and to concurrently transmit to the WCDs of the group on the same air-interface resources as each other, providing multi-user multiple-input-multiple-output (MU-MIMO) service for instance.

One technical problem that could occur in practice is that, when a WCD is served with beamforming by a distant first access node, the WCD may move into strong coverage of a closer second access node and the WCD may transmit an associated measurement report to the first access node, but due to the distance and/or RF obstructions between the WCD and the first access node, the first access node may not receive the WCD's measurement report. As a result, the first access node may not process handover of the WCD to the second access node, and due to the poor channel conditions between the WCD and the first access node, the WCD may experience radio link failure and loss of connectivity with the first access node. Further, if the WCD was engaged in a communication at the time, that communication may be dropped, which may create a user experience problem.

By way of example, this problem could occur in a situation where the WCD is served with beamforming by the first access node and where a building or other RF obstruction exists between the WCD and the second access node, and where the WCD then moves around the RF obstruction such that the RF obstruction is now between the WCD and the first access node and the WCD is within clear, strong coverage of the second access node. In that situation, the WCD may still be receiving some downlink beamformed transmission from the first access node, but the WCD's uplink measurement-report transmission to the first access node may not make it successfully to the first access node, and so the first access node may not trigger handover of the WCD to the second access node.

Where such RF topology exists, or in other situations, many WCDs may tend to experience the same problem. Namely, from time to time, each of various WCDs may experience (i) being served with beamforming by the first access node and reporting to the first access node that the WCD has threshold weak coverage of the first access node and threshold strong coverage of a second access node, but the first access node then not handing the WCD over to the second access node, thus possibly leading to the WCD experiencing radio link failure.

The present disclosure provides a mechanism to help address this problem.

In accordance with the disclosure, a computing system will track geolocations of WCDs where each WCD was positioned when the WCD was served with beamforming by a first access node and the WCD transmitted to the first access node a measurement report that indicated the WCD being within threshold weak coverage of the first access node and threshold strong coverage of a second access node but that did not trigger handover of the WCD from the first access node to the second access node. Based on this tracking, the computing system could thereby identify a geolocation area (e.g., based on a cluster of the tracked geolocations) representative of where WCDs tend to experience that problem. And then based on the identifying of the geolocation area, the computing system could blindly trigger handover of a given WCD from the first access node to the second access node in response to at least determining that the given WCD is served with beamforming by the first access node and is positioned within the identified geolocation area, without the first base station receiving from the given WCD a measurement report for the handover.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
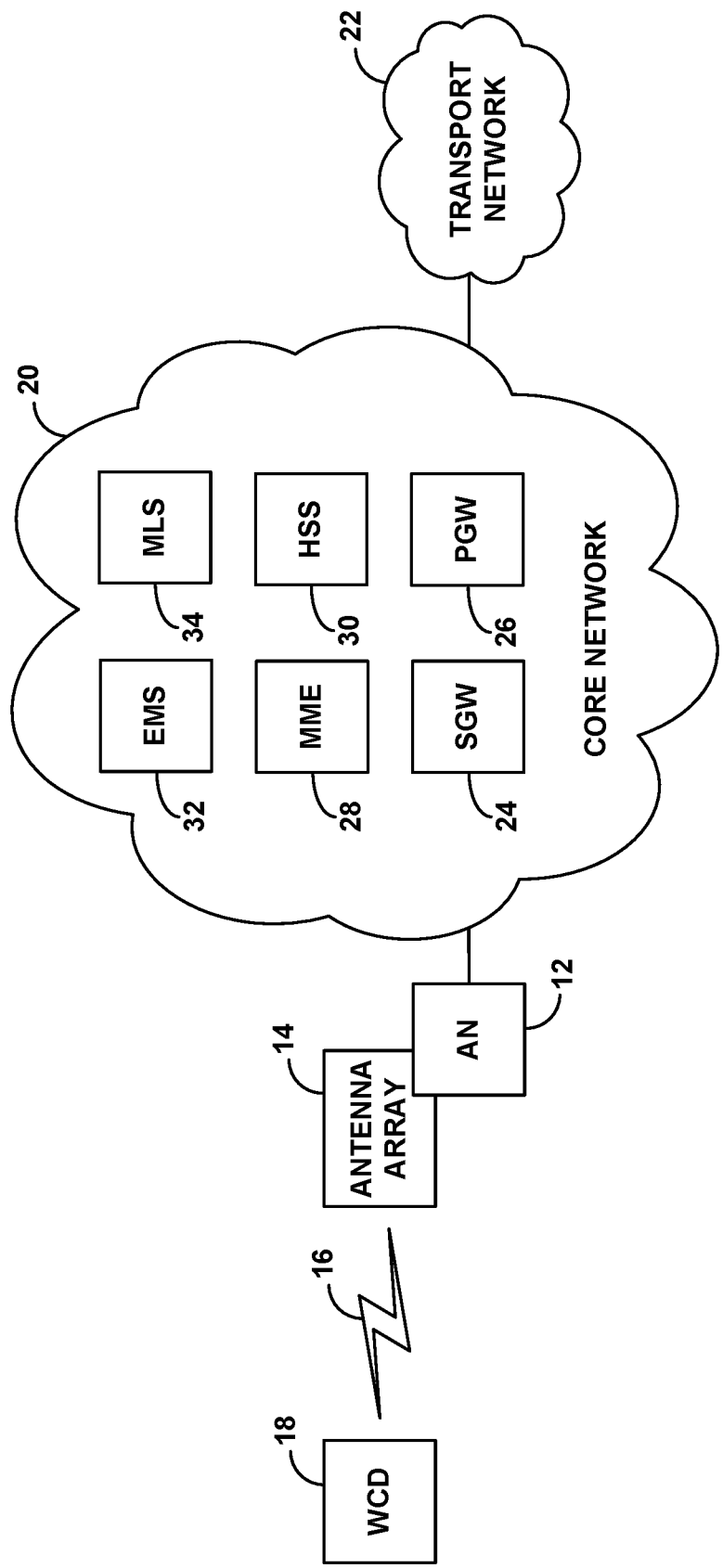
FIG. 1 is a simplified block diagram of an example wireless communication system in which various disclosed features could be implemented.

An example implementation will now be described in the context of a 4G LTE and/or 5G NR network. It should be understood, however, that the principles disclosed herein could extend to apply with respect to other scenarios as well, such as with respect to other RATs and other configurations. Further, it should be understood that other variations from the specific arrangements and processes described are possible. For instance, various described entities, connections, operations, and other elements could be added, omitted, distributed, re-located, re-ordered, combined, or changed in other ways.

As noted above, FIG. 1 is a simplified block diagram of an example wireless communication network in which various disclosed features can be implemented. In particular, the figure depicts a representative arrangement including an example access node 12 having an antenna array 14 and configured to provide an RF coverage area 16 in which to serve WCDs, such as a representative WCD 18.

The access node could be a macro access node of the type configured to provide a wide range of coverage, and the antenna array 14 could be mounted on a tower or other tall structure. Alternatively, the access node could take other forms, such as a small cell access node, a relay access node, a femtocell access node, or the like, which might be configured to provide a smaller range of coverage. And the access node could be configured to operate according to a 4G, 5G, or other radio access technology. For instance, the access node could be an LTE evolved Node-B (eNB) or a 5G NR next-generation Node-B (gNB), among other possibilities.

In an example implementation, without limitation, the access node could provide coverage 16 configured as described above, defining various air-interface resources for carrying communications between the access node and WCDs such as WCD 18.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements as noted above, each occupying a subcarrier and symbol time segment, and the access node and WCDs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to WCDs. And other resource elements per subframe could be reserved to define a shared channel in which PRBs could carry scheduled data communications from the access node to WCDs.

Further, in certain subframes, a group of resource elements centered on the center frequency of each carrier could be reserved to carry synchronization signals that WCDs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals as noted above, which WCDs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from WCDs to the access node. And other resource elements per subframe could be reserved to define a shared channel in which PRBs could carry scheduled data communications from WCDs to the access node. Further, still other resources on the uplink could be reserved for other purposes as well, such as for carrying uplink reference signals or the like.

In the example of FIG. 1, the access node 12 is shown interconnected with a core network 20 that provides connectivity with a transport network 22. The core network 20 could be a packet-switched network configured as an Evolved Packet Core (EPC) network or a Next Generation Core (NGC) core network, among other possibilities, with entities having Internet Protocol (IP) addresses and being configured to communicate with each other through virtual packet-tunnels or the like.

In an example EPC arrangement, as shown, the core network include a serving gateway (SGW) 24 and a packet-data-network gateway (PGW) 26, for carrying user-plane communications through the core network between the access node 12 and the transport network. Further, the core network includes a mobility management entity (MME) 28, which functions as a core-network controller, responsible for managing WCD attachment and bearer setup, among other operations, and a home subscriber server (HSS) 30, which stores WCD profile records and may specify service-subscription plans, WCD configurations, and/or other such WCD capability information.

The example core network is also shown including an element management system (EMS) 32, which could operate as a central repository of operational data for the wireless communication network and to control and manage operation of various network elements, to help ensure optimal use of their resources for instance. In practice, entities such as the access node could regularly report to the EMS various operational data, such as data regarding connectivity and service of individual WCDs, and data regarding access node load and performance, among others. And the EMS could oversee operation of the access node and other entities, providing operation directives or the like.

The network of FIG. 1 could be implemented by a wireless service provider, to which the representative WCD 18 subscribes to receive wireless communication service. For instance, the network could be implemented by a cellular wireless carrier, among other possibilities.

When WCD 18 enters into coverage of this network, the WCD could discover threshold strong coverage of access node 12 and, as noted above, could then engage in random-access and connection signaling, to establish an RRC connection with the access node. Further, the WCD could engage in attach signaling through the access node with the MME. And after authentication of the WCD, the MME could coordinate setup for the WCD of one or more user-plane bearers each including a radio-access bearer (RAB) having a data radio bearer (DRB) extending over the air between the access node and the WCD and an S1-U tunnel between the access node and the SGW, and an S5 tunnel between the SGW and the PGW. In addition, the access node could establish for the WCD a context record, indicating the WCD's connected state and one or more bearers configured for the WCD.

In relation to this attachment process or at another time, the access node could also obtain configuration and capabilities data regarding the WCD, such as data indicating the WCD device type (e.g., whether the device is an IoT type device or a consumer device) and service subscription details (e.g., whether the device supports voice call communication, etc.), and could store this data in the WCD context record for reference while serving the WCD. For instance, during the attachment process, the MME could obtain this data from the HSS and could covey the data to the access node for storage, or the WCD could provide the access node with a report of this data. Further, the EMS could also have access to this data regarding the WCD, perhaps obtaining the data from the HSS or access node, among other possibilities.

Once the WCD is so connected and attached, as noted above, the access node could then serve the WCD. For instance, as the access node receives data destined to the WCD, the access node could and provide schedule transmission to the WCD of a block of that data at a time in downlink PRBs or other such air interface resources. And as the WCD has data to transmit, the access node could schedule transmission from the WCD, and the WCD could provide transmission, of a block of that data at a time in uplink PRBs or other such air-interface resources.

For each such transmission, if the receiving end does not successfully receive the scheduled transmission, defining a block error, the receiving end could responsively transmit to the transmitting end a negative acknowledgement (NACK) control message, and the transmitting end could then responsively engage in retransmission to the receiving end, repeating this possibly multiple times with error correction coding, to help ensure successful receipt of the data. Further, the access node could track and report to the EMS various associated block-error rate and retransmission-rate data as to the access node's service of the WCD, with associated timestamps.

As further discussed above, while access node is serving the WCD, the access node could configure beamforming service of the WCD. To configure beamforming service of the WCD, by way of example, the access node could engage in signaling with the WCD to obtain channel estimates or the like that enable the access node to set amplitude and phase of various antenna signals that will be output to the WCD so as to form a composite beam focused in the direction of the WCD. For instance, the access node could provide special downlink reference signals from each of various antennas, the WCD could measure and report attributes of those signals as received, and the access node could use those reports from the WCD as a basis to configure the individual antenna signals. Further, if and when the WCD moves, the WCD and access node could repeat this process, to enable the access node to adaptively beamform to the WCD's latest location.

In practice, the access node could record in the WCD context record a timestamped indication of whether or not the access node is serving the WCD with beamforming (e.g., whether the access node is set such that when the access node has a transmission to provide specifically to the WCD, the access node will beamform that transmission to the WCD). And the access node could report to the EMS whether or not the access node is serving the WCD with beamforming, which the EMS could likewise record with associated timestamp data.

As also noted above, while the access node is serving the WCD, the WCD may from time to time transmit measurement reports and other channel quality reports to the access node. For instance, the WCD may periodically measure coverage strength of the access node and report the measured coverage strength to the access node. Further, the access node could provision the WCD with various measurement objects defining measurement events where the WCD should provide associated measurement reports, such as when coverage strength from the access node is threshold weak and/or when coverage strength from a neighboring access node is threshold strong. And the WCD could thus provide measurement reports when such thresholds are met.

In addition, while the access node is serving the WCD, network could support determining and tracking the geolocation (e.g., latitude/longitude coordinates) of the WCD over time. Various entities may be configured to determine the geolocation of the WCD and to store and report the determined geolocation with timestamp data to various other entities for reference.

By way of example, as shown in FIG. 1, the core network could include a mobile location system (MLS) 34, which could facilitate determining and tracking geolocation of served WCDs. The MLS, in cooperation with a WCD's serving access node and with the WCD, could implement any of various location-determination techniques now known or later developed to determine the WCD's geolocation with a high level of accuracy. And the MLS could report the determined geolocation data with associated timestamps to the EMS and/or serving access node for storage and reference.

Alternatively or additionally, the access node could implement any of various location-determination techniques to determine and track the WCD's location over time and could store timestamped location data for reference and/or could forward the data to the EMS for storage and reference. Further, the WCD could apply any of various location-determination techniques to determine and track its own location over time and could report timestamped location data to the access node, perhaps together with the WCD's measurement reports or other signaling messages, for storage and reference by the access node and/or for forwarding by the access node to the EMS for storage and reference.

The arrangement of FIG. 1 could enable the WCD to engage in various types of communications. For instance, the arrangement might enable the WCD to engage in general Internet communications or other packet-data communications. Further, depending on WCD capabilities, the arrangement might enable the WCD to engage in voice call communication or other sorts of packet-based real-time media communication services. For instance, the core network and/or transport network might include or provide connectivity with an Internet Multimedia System (IMS) (not shown), with which the WCD might communicate via the access node and core network in order to engage in such communications.

When the WCD engages in communications of particular types, the access node could make a timestamped record of that fact in the WCD context record. Further, the access node could transmit an associated report to the EMS, so the EMS could also have a timestamped record of the WCD engaging in that type of communication.

In addition, as the WCD engages in such a communication, one or more entities could regularly evaluate the quality of the communication and could store and/or report the determined quality with associated timestamp data. For instance, the access node or an associated entity could evaluate the communication quality, represented by metrics such as packet loss rate, scheduling delay, jitter, or mean opinion score, among other possibilities, and could store those metrics with associated timestamp data and/or forward the timestamped metrics to EMS for storage and reference. Or the WCD or another entity in the communication path could evaluate such metrics and forward the metrics with timestamp data to the access node and/or EMS for storage and reference.

Figure 2:
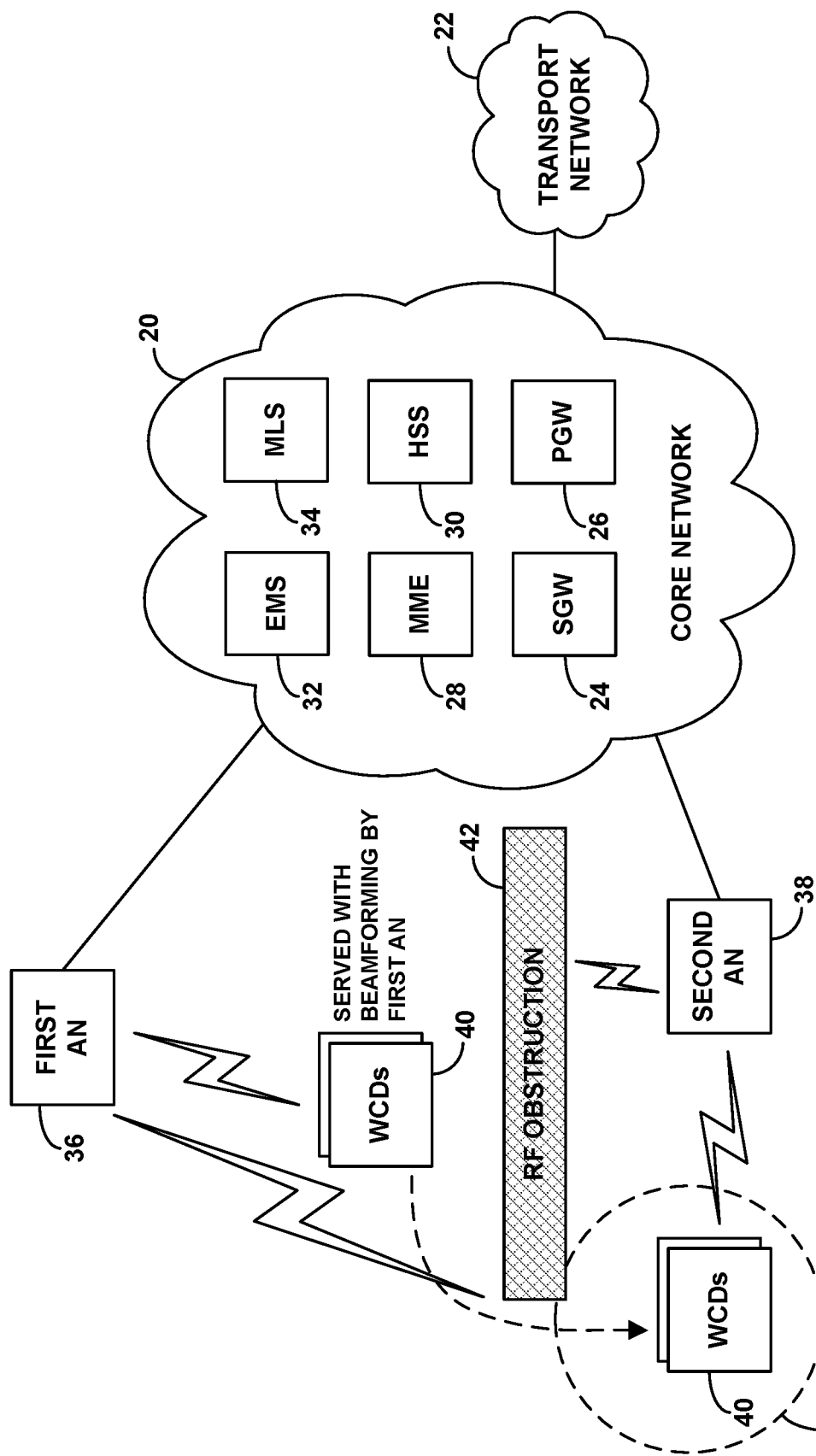
FIG. 2 is a simplified block diagram of an example scenario where the disclosed features could be implemented.

FIG. 2 is next a simplified block diagram depicting, without limitation, an example scenario where the presently disclosed principles could be applied.

FIG. 2 shows a wireless communication network including first access node 36 and a second access node 38 each providing respective coverage in which to serve WCDs, and each being interconnected with the example core network 12 that provides connectivity with the example transport network 22. Each such access node could take any of the forms noted above, possibly different forms than each other, and the access nodes could operate in the manner discussed above, among other possibilities.

Further shown in FIG. 2 are multiple representative WCDs 40, which could from time to time be served by the example access nodes. WCDs 40 are shown as overlapping blocks in the figure for simplicity, though in practice the WCDs 40 may not be positioned at the same geolocation as each other and may operate at different times than each other. Each of these WCDs could subscribe to service of a wireless service provider that operates the example network.

Also shown in FIG. 2 is an example RF obstruction 42. This RF obstruction 42 could be a building, mountain, or one or more other structures or systems that may attenuate or otherwise pose issues for RF propagation. Thus, when a WCD is on one side of the RF obstruction and an access node is on the other side of the RF obstruction, especially if the WCD access node are distant from each other, RF transmission between the WCD and access node may be attenuated or low quality at best, if not altogether blocked.

In this arrangement, each of the various WCDs 40 could from time to time be connected with the first access node 36 and be served by the first access node 36 with beamforming, which the first access node might have configured for any of the reasons discussed above, among other possibilities. Further, as shown by the dashed arrow in the figure, each WCD might move from being within relatively clear coverage of the first access node 36 and RF obstructed from the second access node 38 to being within clear and strong coverage of the second access node 38 and RF obstructed from the first access node 36.

Once the WCD so moves, the WCD may still be receiving some level of downlink beamformed transmissions from the first access node 36, but the WCD's uplink transmissions to the first access node 36 may not make it successfully to the first access nod 36.

In this situation, the WCD may detect that the WCD has threshold weak coverage from the first access node 36 and threshold strong coverage from the second access node 38 (e.g., that that reference signal strength from the first access node 36 is lower than a predefined low threshold and that reference signal strength from the second access node 38 is higher than a predefined high threshold and/or higher by a predefined delta than reference signal strength from the first access node 36). And the WCD may responsively generate and transmit to the first access node 36 a measurement report indicating that the WCD has threshold weak coverage from the first access node 36 and threshold strong coverage from the second access node 38.

Ideally, the first access node 36 would receive this measurement report from the WCD and would responsively trigger handover of the WCD from the first access node 36 to the second access node 38. For instance, upon receiving and reading the measurement report, the first access node 34 could engage in control signaling with the second access node 38, via an X2 (inter-access-node) interface to prepare the second access node 38 to serve the WCD, and the first access node 36 could then transmit to the WCD a handover directive that causes the WCD to transition from being served by the first access node 36 to being served instead by the second access node. The triggering of handover of the WCD could thus involve initiating or engaging in this handover process, among other possibilities.

Unfortunately, however, because the WCD has moved to a position where the WCD is RF obstructed from the first access node 36, the WCD's measurement report may not make it successfully to the first access node 36. For instance, the first access node 36 may not receive the transmitted measurement report or, due to attenuation or other RF degradation, may be unable to decode and interpret the transmission as the intended measurement report. Consequently, the first access node 36 may fail to trigger handover of the WCD to the second access node 38. And as a result, the WCD's connection with the first access node 36 may time out, so the WCD may experience radio link failure, losing its connection with the first access node 36. Further, if the WCD was engaged in a communication served by the first access node 36, that communication may be dropped.

Per the present disclosure, as noted above, a computing system could identify a geolocation area where WCDs tend to be positioned when they experience this problem, and the computing system could then blindly trigger handover of a given WCD from the first access node 36 to the second access node 38 in response to determining that the given WCD is similarly served with beamforming by the first access node 36 and is located in the identified geolocation area, without the first access node 36 receiving from the given WCD a measurement report for triggering the handover.

The computing system that carries out this process could be any system that has access to the underlying data to facilitate identifying the geolocation area and that could control implementation of the process. For instance, the computing system could be provided by the first access node and/or the EMS, among other possibilities.

The act of identifying the geolocation area where WCDs tend to be positioned when they experience this problem could be done in real time as the WCDs experience the problem and/or could be done through post-processing of associated data.

In practice, the computing system could learn of each of multiple instances in which a respective a WCD is served with beamforming by the first access node 36 and transmits to the first access node 36 a measurement report indicating that the WCD has threshold weak coverage of the first access node 36 and threshold strong coverage of the second access node 38, but where that measurement report does not result in triggering handover of the WCD from the first access node 36 to the second access node 38, i.e., where there is an associated failure to trigger handover of the WCD.

The computing system could learn of each such instance in various ways. For example, after the WCD experiences the associated radio link failure, the WCD may newly scan for coverage and reconnect, but this time likely with the second access node 38. Once the WCD so reconnects, the WCD could then transmit to second access node 38 a report of the WCD having transmitted to the first access node 36 the measurement report that did not result in handover of the WCD, and second access node 38 could forward this report to the computing system—such as to the first access node 36 or to the EMS 32. Alternatively, once the WCD reconnects, the WCD could send such a report directly or indirectly to the computing system in another manner.

With each such report, the WCD could include certain useful information that may help to facilitate the present process. For instance, the WCD could specify a timestamp of when the WCD transmitted the measurement report to the first access node 36 and/or when the WCD experienced the resulting radio link failure. Further, if the WCD has an indication of what the WCD's geolocation was at that time, the WCD could specify that geolocation as well. Still further, if the WCD is aware of the fact that the WCD was served with beamforming at the time, the WCD could include an indication that the WCD was served with beamforming at that time. And the WCD could include information regarding the WCD's connection and communication quality at the time, such as an indication of retransmission rate, block error rate, degradation in call quality, or the like. Further, the WCD could include an indication that the measurement report that the WCD transmitted did not result in the WCD receiving a handover directive from the first access node 36, i.e., that there was an associated failure to trigger handover of the WCD.

For each such instance, the computing system could thus learn from the WCD's report at least that the WCD transmitted to the first access node 36 a measurement report indicating that the WCD has threshold poor coverage of the first access node and threshold strong coverage of the second access node. And the computing system could also learn from the WCD's report, and/or from previously recorded data with correlated in time with the timestamp data provided by the WCD's report, that the WCD was served with beamforming by the first access node 36 at time.

In addition, for each such instance, the computing system could learn the geolocation where the WCD was positioned when the WCD transmitted the measurement report that did not lead to handover of the WCD (perhaps represented by the WCD's location when the WCD experienced the associated radio link failure due to the first access node's failure to trigger handover). For instance, if the WCD's report included an indication of this geolocation, the computing system could deem that geolocation to be the WCD's geolocation at the time. Alternatively, the computing system could learn the WCD's geolocation at the time by correlating previous timestamped location data with the timestamp data provided by the WCD's report, among other possibilities, and could deem that geolocation to be the WCD's geolocation at the time.

Having detected multiple such instances and thus determined multiple such geolocations, the computing system could then identify a geolocation area 44 where WCDs tend to be positioned when they experience this issue. For instance, the computing system could apply a clustering analysis to identify cluster of the geolocations and could develop a polygon or other shape (shown by way of example in the figure as a circle) bounding the cluster, as a representation of the identified geolocation area.

Once the computing system has thereby identified the geolocation area 44, the computing system could then use the identified geolocation area 44 as a basis to blindly trigger handover of a given WCD from the first access node 36 to the second access node 38, i.e., without the first access node 36 successfully receiving from the given WCD a measurement report for triggering the handover.

For instance, while the first access node 36 is serving the given WCD with beamforming, the first access node 36 could determine based on location tracking that the given WCD has moved into the identified geolocation area 44. And in response, without receiving from the given WCD a measurement report indicating this instance of the given WCD having threshold weak coverage of the first access node 36 and threshold strong coverage of the second access node 38, the first access node 36 could blindly trigger handover of the given WCD. Namely, based at least on determining that the first access node 36 is serving the given WCD with beamforming and that the given access node is in the identified geolocation area 44, the first access node 36 could engage in handover-preparation signaling with the second access node 38 and could then direct the given WCD to hand over to the second access node 38.

Alternatively, while the first access node 36 is serving the given WCD with beamforming, the EMS could determine from reported data that the first access node 36 is serving the given WCD with beamforming and could determine based on location tracking data that the given WCD has moved into the identified geolocation area 44. And in response, without the first access node 36 having received from the given WCD a measurement report indicating this instance of the given WCD having threshold weak coverage of the first access node 36 and threshold strong coverage of the second access node 38, the EMS could transmit to the first access node 36 a directive to hand the given WCD over to the second access node 38. The first access node 36 could then blindly trigger that handover of the given WCD as directed.

Optimally, this process could thereby facilitate handover of the given WCD to the second access node 38 in the scenario where a measurement report from the given WCD would unlikely likely to reach the WCD's serving first access node 36. Thus, the process may help to prevent radio link failure and associated issues.

Figure 3:
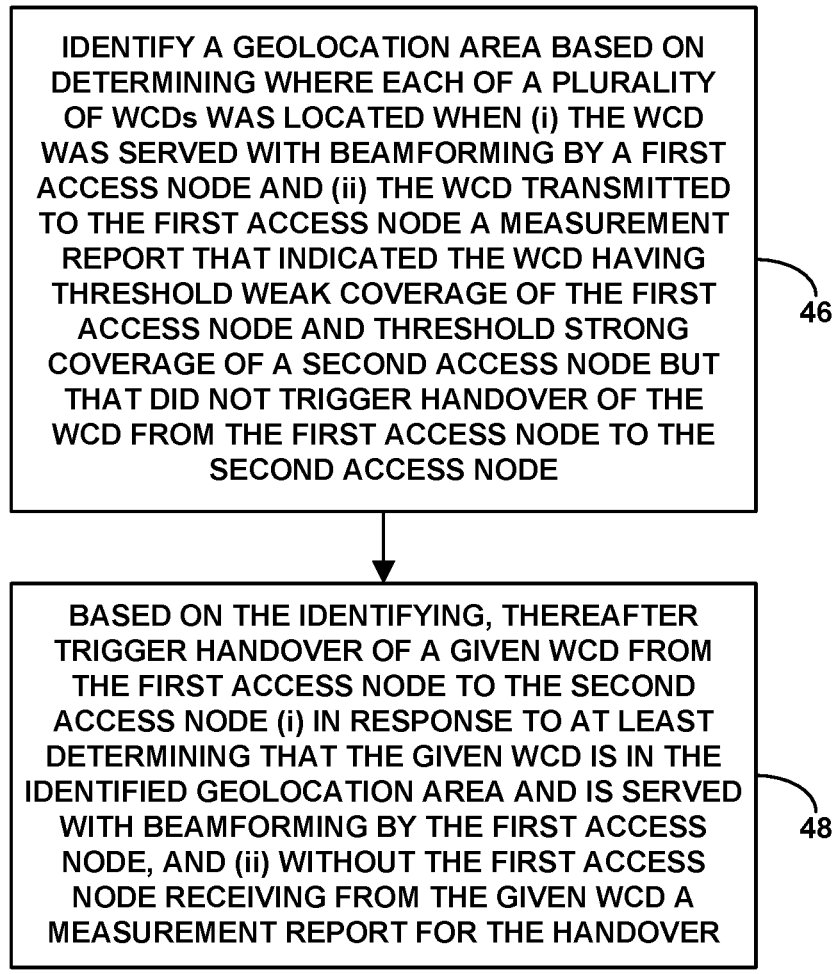
FIG. 3 is a flow chart depicting an example method in accordance with the present disclosure.

FIG. 3 is a flow chart depicting a method that could be carried out by a computing system to facilitate blindly triggering handover based on past failures to trigger handover of beamforming-served devices.

As shown in FIG. 3, at block 46, the method includes identifying a geolocation area based on determining where each of a plurality of WCDs was located when (i) the WCD was served with beamforming by a first access node and (ii) the WCD transmitted to the first access node a measurement report that indicated the WCD having threshold weak coverage of the first access node and threshold strong coverage of a second access node but that did not trigger handover of the WCD from the first access node to the second access node. And at block 48, the method includes, based on the identifying, thereafter triggering handover of a given WCD from the first access node to the second access node (i) in response to at least determining that the given WCD is in the identified geolocation area and is served with beamforming by the first access node, and (ii) without the first access node receiving from the given WCD a measurement report for the handover.

In line with the discussion above, the act of identifying the geolocation area in this method could include determining geolocations of the plurality of WCDs and identifying the geolocation area based on the determined geolocations of the plurality of WCDs.

Further, the act of determining the geolocations of the plurality of WCDs could involve, for each respective WCD of the plurality, (a) detecting a respective failure to trigger handover, based at least on (i) the WCD transmitting to the first access node a respective measurement report indicating the respective WCD having threshold weak coverage of the first access node and threshold strong coverage of a second access node, when the respective WCD was served with beamforming by the first access node, and (ii) the respective measurement report not triggering handover of the respective WCD from the first access node to the second access node and (b) based on the detected respective failure to trigger handover, determining as one of the geolocations a respective geolocation where the respective WCD was positioned when the respective WCD transmitted the respective measurement report to the first access node.

In practice, the act of detecting the respective failure to trigger handover could be further based on the respective WCD having lost connectivity with the first access node after having transmitted to the first access node the respective measurement report that did not trigger handover of the respective WCD from the first access node to the second access node. Here, for instance, in addition to learning that the respective WCD transmitted the measurement report that did not result in triggering handover of the respective WCD, the computing system could also learn from recorded data that the respective WCD experienced a radio link failure at or just after that time. And the computing system could deem the failure to trigger handover to be a relevant instance, based further on that fact.

In addition, the act of detecting the respective failure to trigger handover could be further based on the first access node not receiving the respective measurement report transmitted by the respective WCD. For instance, having determined that the WCD transmitted the measurement report, the computing system could also determine from operational data records that the first access node did not receive that transmitted measurement report. And the computing system could deem the failure to trigger handover to be a relevant instance, based further on that fact.

Still further, the act of detecting the respective failure to trigger handover could be further based on the respective WCD having a threshold poor performance metric for service by the first access node when the respective WCD was at the respective geolocation. Here, for instance, the threshold poor performance metric might be threshold high retransmission rate, threshold high error rate, and/or threshold low communication quality, among other possibilities, which the computing system could likewise determine from operational data records. And the computing system could deem the failure to trigger handover to be a relevant instance, based further on one or more such poor performance metrics.

Yet further, as discussed above, the act of detecting the respective failure to trigger handover could be further based on reporting by the respective WCD that (i) the respective WCD transmitted to the first access node the respective measurement report indicating the respective WCD having threshold weak coverage of the first access node and threshold strong coverage of a second access node (ii) the respective WCD then having lost connectivity with the first access node without having received from the first access node, in response to the respective measurement report, a directive for the respective WCD to hand over from the first access node to the second access node.

As additionally discussed above, the act of triggering the handover of the given WCD from the first access node to the second access node could be additionally responsive to one or more other factors as well.

For instance, the computing system could trigger the handover both in response to determining that the given WCD is served with beamforming by the first access node and is in the identified geolocation area and additionally in response to (e.g., conditional upon) determining that the given WCD is of a particular type (e.g., that the given WCD is an IoT device, is a consumer device, has a particular make, model, or the like, among other possibilities), by reference to stored WCD configuration data. Alternatively or additionally, the computing system could trigger the handover both in response to determining that the given WCD is served with beamforming by the first access node and is in the identified geolocation area and further in response to (e.g., conditional upon) determining that the given WCD is engaged in a latency-sensitive communication (e.g., a VoIP call) served by the first access node, by reference to stored operational data.

In line with the discussion above, the computing system that carried out this process could be disposed at least partially within a core network to which both the first access node and second access node provide connectivity. For instance, the computing system could be an EMS. And the act of triggering the handover of the given WCD could involve transmitting from the computing system, through the core network to the first access node, a directive that causes the first access node to initiate processing of handover of the given WCD from the first access node to the second access node.

Alternatively or additionally, the computing system could be implemented at least partially at the first access node, in which case the act of triggering handover of the given WCD could involve the first access node initiating processing of handover of the given WCD from the first access node to the second access node.

Figure 4:
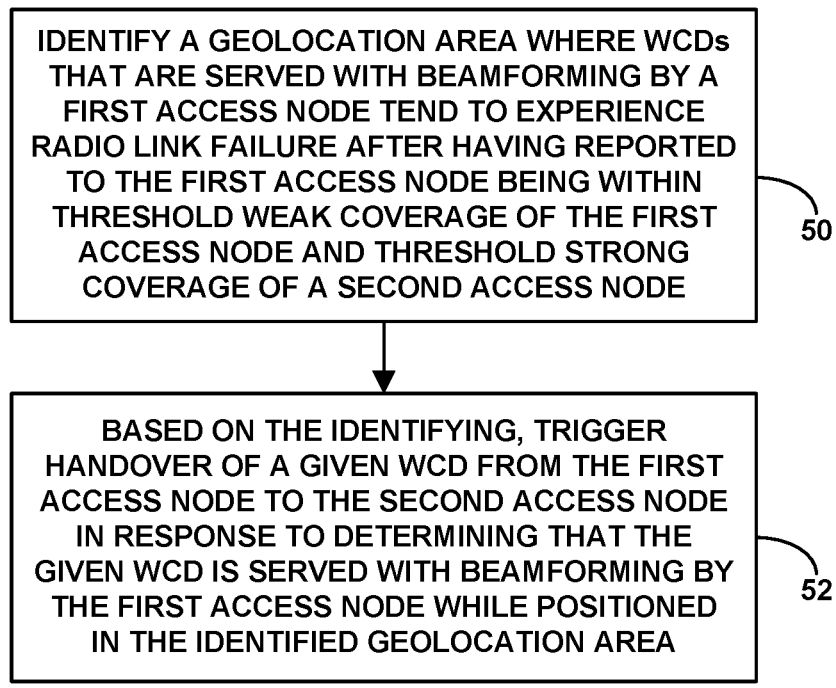
FIG. 4 is another flow chart depicting an example method in accordance with the disclosure.

FIG. 4 is next another flow chart depicting a method that could be carried out in accordance with the discussion above, for blindly triggering handover based on past failures to trigger handover of beamforming-served devices. As shown in FIG. 4, at block 50, the method include identifying a geolocation area where WCDs that are served with beamforming by a first access node tend to experience radio link failure after having reported to the first access node being within threshold weak coverage of the first access node and threshold strong coverage of a second access node. And at block 52, the method includes, based on the identifying, triggering handover of a given WCD from the first access node to the second access node in response to determining that the given WCD is served with beamforming by the first access node while positioned in the identified geolocation area.

Various features discussed above could be implemented in this context as well, and vice versa.

Figure 5:
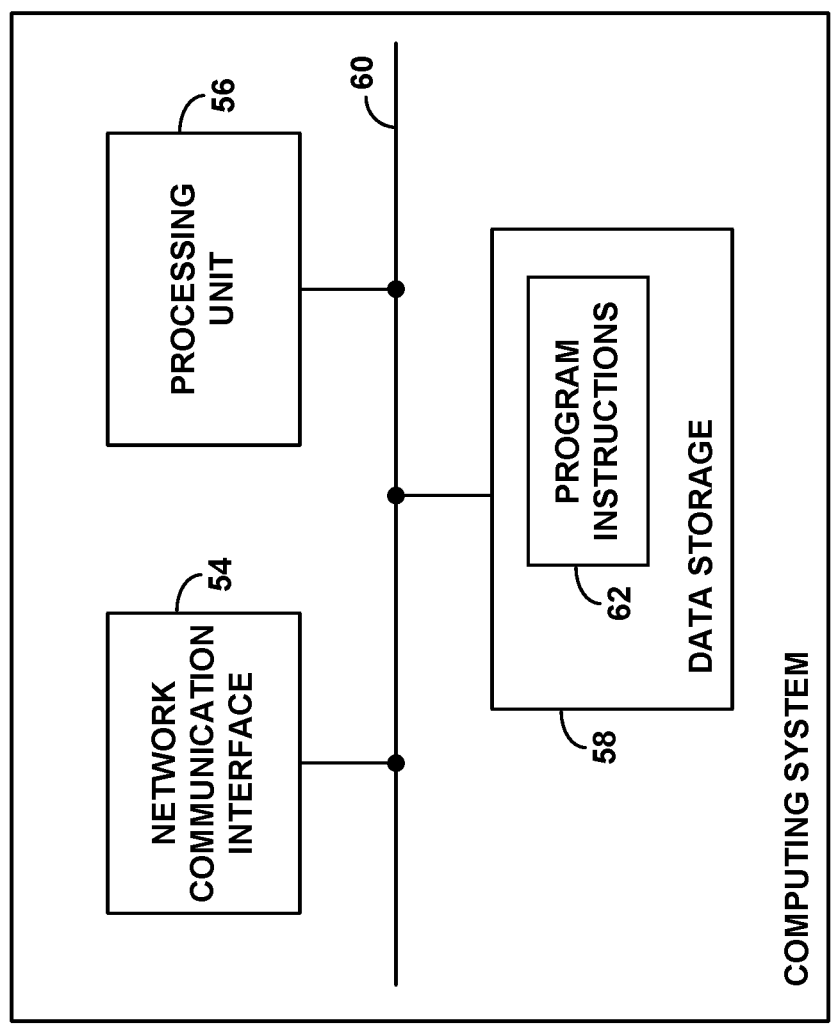
FIG. 5 is a simplified block diagram of an example computing system operable in accordance with the disclosure.

FIG. 5 is a simplified block diagram of an example computing system that could be configured to carry out the operations described herein. As shown in FIG. 5, the example computing system includes a network communication interface 54, a processing unit 56, and non-transitory data storage 58, all of which could be integrated together and/or interconnected by a system bus, network, or other connection mechanism 60.

The network communication interface 54 could include a physical network connector and associated communication logic to facilitate network communication with various other entities. The processing unit 56 could comprise one or more general purpose processors (e.g., microprocessors) and/or one or more special-purpose processors (e.g., application specific integrated circuits). And the data storage 58 could comprise one or more volatile and/or non-volatile storage components (e.g., magnetic, optical, or flash storage).

As shown, the data storage 58 could then store program instructions 62, which could be executable by the processing unit 56 to carry out various operations described herein. For instance, the instructions could be executable to carry out the operations of FIGS. 3 and 4.

Figure 6:
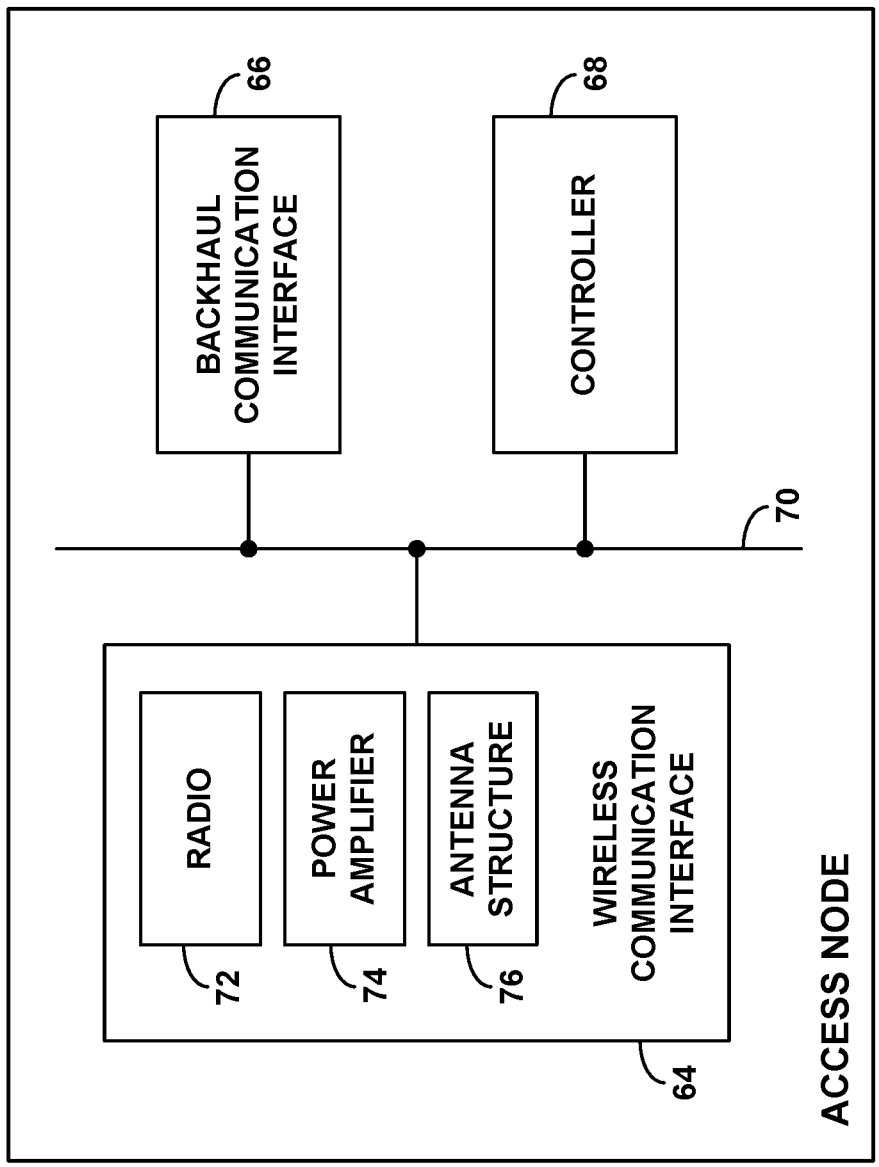
FIG. 6 is a simplified block diagram of an example access node operable in accordance with the present disclosure.

Finally, FIG. 6 is a simplified block diagram of an example access node that could operate in accordance with the present disclosure, as first access node 36 for instance.

As shown in FIG. 6, the example access node includes a wireless communication interface 64, a backhaul communication interface 66, and a controller 68, which could be integrated together and/or communicatively linked by a network, system bus, or other connection mechanism 70.

Wireless communication interface 64 includes a radio 72, a power amplifier 74, and antenna structure 76. The radio 72 could operate to interface between encoded baseband signals and radio frequency signals. The power amplifier 74 could operate to amplify signals for transmission by the antenna structure 76. And the antenna structure 76 could comprise a plurality of antennas for communicating over the air interface, optimally as an array such as a massive-MIMO array for instance, to facilitate beamforming and other operations.

Backhaul communication interface 66 could be a network communication interface (e.g., an Ethernet network interface port and/or connection) through which the access node can communicate with various other network entities.

And controller 68, which could comprise a processing unit, data storage, and program instructions stored in the data storage and executable by the processing unit, or could take other forms, could be operable to cause the access node to carry out various operations as described herein.

Various features described above can be implemented in this context as well, and vice versa.

Further, the present disclosure contemplates a computer readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

We claim:

1. A computing system for blindly triggering handover based on past failures to trigger handover of beamforming-served devices, the computing system comprising:
    at least one processing unit;
    at least one non-transitory data storage; and
    program instructions stored in the at least one non-transitory data storage and executable by the at least one processing unit to carry out operations comprising:
        identifying a geolocation area based on determining where each of a plurality of wireless communication devices (WCDs) was located when (i) the WCD was served with beamforming by a first access node and (ii) the WCD transmitted to the first access node a measurement report that indicated the WCD having threshold weak coverage of the first access node and threshold strong coverage of a second access node but that did not trigger handover of the WCD from the first access node to the second access node, and
        based on the identifying, thereafter triggering handover of a given WCD from the first access node to the second access node (i) in response to at least determining that the given WCD is in the identified geolocation area and is served with beamforming by the first access node, and (ii) without the first access node receiving from the given WCD a measurement report for the handover.

2. The computing system of claim 1, wherein identifying the geolocation area comprises:
    determining geolocations of the plurality of WCDs; and
    identifying the geolocation area based on the determined geolocations of the plurality of WCDs.

3. The computing system of claim 2, wherein determining the geolocations of the plurality of WCDs comprises, for each respective WCD of the plurality:
    detecting a respective failure to trigger handover, based at least on (i) the WCD transmitting to the first access node a respective measurement report indicating the respective WCD having threshold weak coverage of the first access node and threshold strong coverage of a second access node, when the respective WCD was served with beamforming by the first access node, and (ii) the respective measurement report not triggering handover of the respective WCD from the first access node to the second access node; and
    based on the detected respective failure to trigger handover, determining as one of the geolocations a respective geolocation where the respective WCD was positioned when the respective WCD transmitted the respective measurement report to the first access node.

4. The computing system of claim 3, wherein detecting the respective failure to trigger handover is based further on the respective WCD having lost connectivity with the first access node after having transmitted to the first access node the respective measurement report that did not trigger handover of the respective WCD from the first access node to the second access node.

5. The computing system of claim 3, wherein detecting the respective failure to trigger handover is based further on the first access node not receiving the respective measurement report transmitted by the respective WCD.

6. The computing system of claim 3, wherein detecting the respective failure to trigger handover is based further on the respective WCD having a threshold poor performance metric for service by the first access node when the respective WCD was at the respective geolocation, wherein the threshold poor performance metric is selected from the group consisting of threshold high retransmission rate, threshold high error rate, and threshold low communication quality.

7. The computing system of claim 1, wherein detecting the respective failure to trigger handover is based on reporting by the respective WCD that (i) the respective WCD transmitted to the first access node the respective measurement report indicating the respective WCD having threshold weak coverage of the first access node and threshold strong coverage of a second access node (ii) the respective WCD then having lost connectivity with the first access node without having received from the first access node, in response to the respective measurement report, a directive for the respective WCD to hand over from the first access node to the second access node.

8. The computing system of claim 1, wherein triggering the handover of the given WCD from the first access node to the second access node is additionally responsive to the given WCD being of a particular device type.

9. The computing system of claim 1, wherein triggering the handover of the given WCD from the first access node to the second access node is additionally responsive to the given WCD being engaged in a latency-sensitive communication served by the first access node.

10. The computing system of claim 1, wherein the computing system is disposed at least partially within a core network to which the first access node and second access node provide connectivity.

11. The computing system of claim 10, wherein the computing system is an element management system (EMS).

12. The computing system of claim 10, wherein triggering the handover of the given WCD comprises transmitting from the computing system, through the core network to the first access node, a directive that causes the first access node to initiate processing of handover of the given WCD from the first access node to the second access node.

13. The computing system of claim 1, wherein the computing system is implemented at least partially at the first access node.

14. The computing system of claim 13, wherein triggering the handover of the given WCD comprises the first access node initiating processing of handover of the given WCD from the first access node to the second access node.

15. A method for blindly triggering handover based on past failures to trigger handover of beamforming-served devices, the method comprising:
    identifying, by a computing system, a geolocation area based on determining where each of a plurality of wireless communication devices (WCDs) was located when (i) the WCD was served with beamforming by a first access node and (ii) the WCD transmitted to the first access node a measurement report that indicated the WCD having threshold weak coverage of the first access node and threshold strong coverage of a second access node but that did not trigger handover of the WCD from the first access node to the second access node; and
    based on the identifying, thereafter triggering by the computing system handover of a given WCD from the first access node to the second access node (i) in response to at least determining that the given WCD is in the identified geolocation area and is served with beamforming by the first access node, and (ii) without the first access node receiving from the given WCD a measurement report for the handover.

16. The method of claim 15, wherein identifying the geolocation area comprises:
    determining geolocations of the plurality of WCDs; and
    identifying the geolocation area based on the determined geolocations of the plurality of WCDs.

17. The method of claim 16, wherein determining the geolocations of the plurality of WCDs comprises, for each respective WCD of the plurality:
    detecting a respective failure to trigger handover, based at least on (i) the WCD transmitting to the first access node a respective measurement report indicating the respective WCD having threshold weak coverage of the first access node and threshold strong coverage of a second access node, when the respective WCD was served with beamforming by the first access node, and (ii) the respective measurement report not triggering handover of the respective WCD from the first access node to the second access node; and
    based on the detected respective failure to trigger handover, determining as one of the geolocations a respective geolocation where the respective WCD was positioned when the respective WCD transmitted the respective measurement report to the first access node.

18. The method of claim 17, wherein detecting the respective failure to trigger handover is based further on the respective WCD having lost connectivity with the first access node after having transmitted to the first access node the respective measurement report that did not trigger handover of the respective WCD from the first access node to the second access node.

19. The method of claim 15, wherein the method is implemented by a wireless service provider that operates the first and second access nodes and to which at least the given WCD subscribes for service.

20. A method for blindly triggering handover based on past failures to trigger handover of beamforming-served devices, the method comprising:
    identifying a geolocation area where wireless communication devices (WCDs) that are served with beamforming by a first access node tend to experience radio link failure after having reported to the first access node being within threshold weak coverage of the first access node and threshold strong coverage of a second access node; and
    based on the identifying, triggering handover of a given WCD from the first access node to the second access node in response to determining that the given WCD is served with beamforming by the first access node while positioned in the identified geolocation area.

* * * * *